Figure 1:
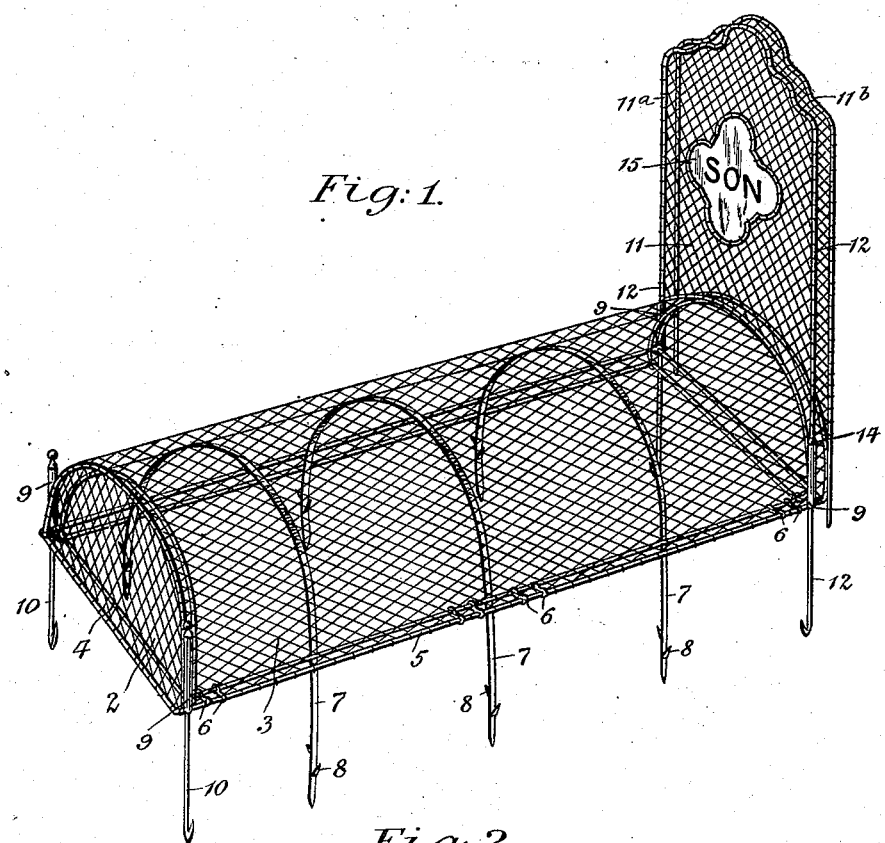

No. 873,279. PATENTED DEC. 10, 1907.
C. WEBER-ILLIG.
COVER FOR DECORATING MOUNDS, GRAVES, AND OTHER SIMILAR PURPOSES.
APPLICATION FILED NOV. 11, 1905.

2 SHEETS—SHEET 1.

Witnesses:
John A. Rennie
James Johnson

Inventor:
Carl Weber-Illig

No. 873,279.
PATENTED DEC. 10, 1907.
C. WEBER-ILLIG.
COVER FOR DECORATING MOUNDS, GRAVES, AND OTHER SIMILAR PURPOSES.
APPLICATION FILED NOV. 11, 1905.
2 SHEETS—SHEET 2.
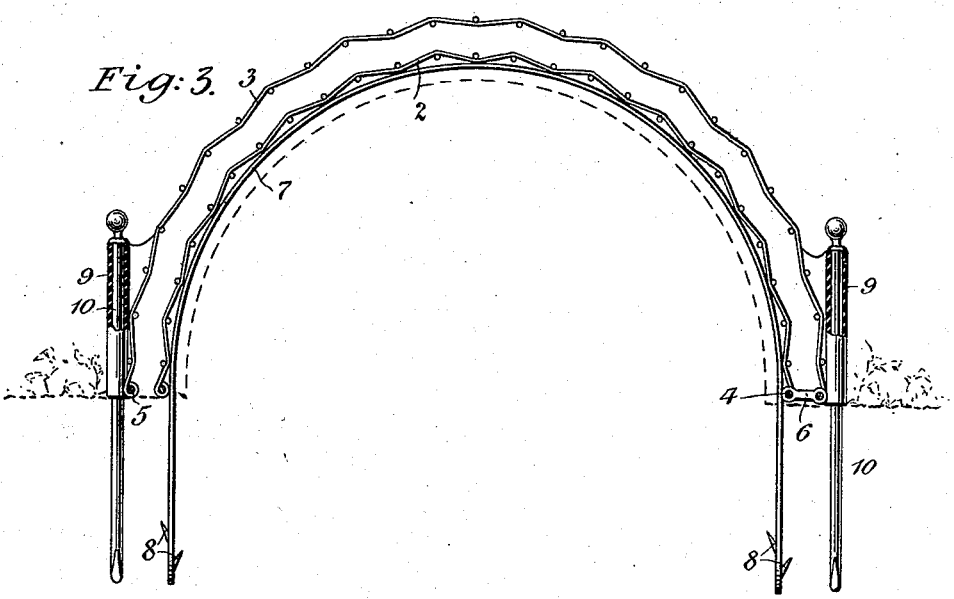
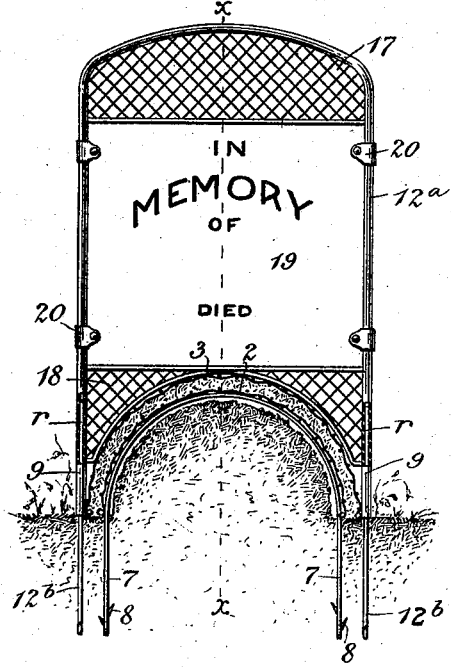
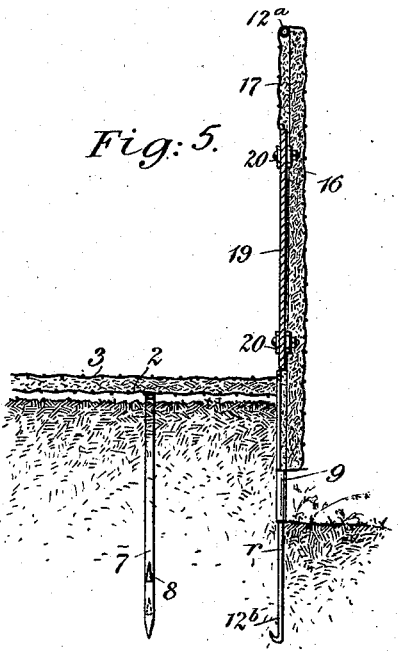
Witnesses:
John A. Rennie
James Johnson
Inventor:
Carl Weber-Illig

UNITED STATES PATENT OFFICE.

CARL WEBER-ILLIG, OF DELAWANNA, NEW JERSEY.

COVER FOR DECORATING MOUNDS, GRAVES, AND OTHER SIMILAR PURPOSES.

No. 873,279.      Specification of Letters Patent.      Patented Dec. 10, 1907.

Application filed November 11, 1905. Serial No. 286,800.

*To all whom it may concern:*

Be it known that I, CARL WEBER-ILLIG, a citizen of the United States, residing at Delawanna, in the county of Passaic and State of New Jersey, have invented certain new and useful Improvements in Covers for Decorating Mounds, Graves, and other Similar Purposes, of which the following is a specification.

My invention relates to covers to be used for covering mounds, graves and other similar purposes and which are primarily intended either for beautifying a newly made grave or for providing convenient and simple means for holding moss or earth as a bed for artificial or natural flowers, ferns, leaves, etc., as well as for protecting natural flower beds during times of frost and against other disturbing elements.

My invention contemplates a convenient and effective cover for graves, mounds, etc., which comprises an inner and outer body portion of wire mesh, said body portions being capable when in position, of being maintained at a definite distance with respect to each other so that an interspace or receptacle will be provided, in which can be positively confined artificial flowers, bay leaves, ferns and other means for ornamenting newly made graves, or a bedding of highly fertilized soil can with equal positiveness, be maintained within said space or receptacle for permitting natural flowers to be planted at such times as weather conditions are suitable.

My invention further contemplates the use, in connection with grave covers, of a simple and effective head piece which is also arranged to provide a positive receptacle for the reception of either artificial or natural flowers as well as for a suitable means on which to inscribe the name of the person reposing in the grave.

My invention still further contemplates the employment of appropriate means for securing the cover, either alone or in conjunction with the head piece so that it, or they, may be rendered proof against disturbance by the elements, or by other accidental or wilful displacement.

With these and other objects in view my invention consists of the novel features of construction and arrangement of parts to be hereinafter fully described and particularly pointed out in the appended claims.

I will now describe a cover embodying my invention and then point out the novel features in claims.

Figure 2:
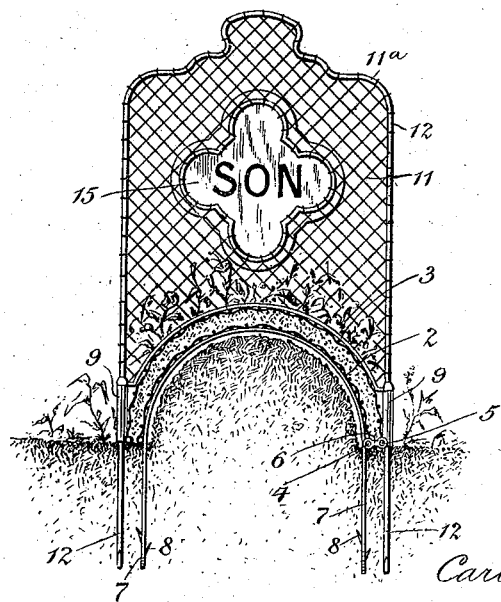

In the accompanying drawing, Figure 1 represents a perspective view of a cover embodying my invention. Fig. 2 is a transverse section thereof, showing the same applied to a mound or grave. Fig. 3 is a view similar to Fig. 2 but on an enlarged scale, and removed from the mound or grave. In this view parts are broken away to show the means for securing the outer body portion of the cover to the ground. Fig. 4 is a transverse section of a modified form of my invention. In this view parts are also broken away to show the means of securing the head piece to the cover and the latter to the ground. Fig. 5 is a central longitudinal section taken on the line $x$, $x$, of Fig. 4.

Similar reference characters designate corresponding parts in all the figures of the drawings.

Referring to Figs. 1, 2 and 3, 2 and 3 designate respectively, an inner and an outer cover composed of open wire mesh, the same being mounted on substantial rectangular frames 4 and 5, which are sufficiently large to conveniently surround the mound or grave, and which, when in position thereon, rest on the ground. As shown, the inner and outer cover may be hinged together by providing suitable link connections 6, although this is not essential and forms no important part of my invention, and may therefore be dispensed with. The inner cover 2, has secured to it a number of arched pieces 7, arranged transversely in their relation to the cover and of sufficient width to conveniently span the mound or grave, their lower ends, which extend below the lower side of the cover, being provided with prongs 8, preferably upturned, as shown, to insure positive and effective anchorage when they are inserted in the ground. These arched pieces serve, also, the purpose of maintaining the cover 2, in its original shape and may be more or less in number according to conditions and requirements.

At each corner of the outer cover 3, I provide a tubular socket 9, fastened thereto in any suitable or convenient manner, and adapted to receive therein, at one end, rods 10, whose upper ends are provided with shoulders or knobs to engage the upper ends of the sockets 9, their lower ends being provided with up-turned hooks adapted to enter the earth and effect a substantial anchorage of the outer cover 3. When no head or foot piece, such as I have illustrated and designate by the numeral 11, is desired, sockets 9 and rods 10 will be employed at each corner of the outer cover 3, but when the head or foot piece 11, is desired, then the lower ends of the surrounding frame 12, thereof, which will be constructed of substantial wire, will be passed through the sockets at that end of the cover at which it is desired to have it placed, and shoulders 14, will be provided to rest upon the upper ends of the sockets 9, thus effecting not only an interlocking of the head or foot piece, and outer cover 3, but also effecting secure anchorage of both to the ground.

The head or foot piece, as the case may be, is composed of two parallel walls $11^a$, $11^b$, of any ornamental or desired contour and separated from each other so as to provide a receptacle to receive moss, earth, artificial or natural flowers, ivy, ferns, leaves, and the like, and one or both walls may be provided with an opening 15, within which may be placed an appropriate stone, slab, or other object, on which to inscribe the name of the person reposing in the grave, as for example "son" shown in Figs. 1 and 2.

In Figs. 4 and 5, I have shown a slightly modified form of head or foot piece, but in other respects the construction is precisely similar to that described and shown in Figs. 1, 2 and 3. It will be observed that the head or foot piece, in this instance is composed of a tubular rod $12^a$, (although a solid rod may be used if desired) bent into appropriate or desired shape, its lower terminals being provided with extensions $12^b$, preferably bent into the form of hooks and adapted to enter the ground for the purpose of anchoring the head or foot piece firmly therein. If a solid rod is used for the purpose, its terminals may be bent into the form of hooks, but if a tubular rod is preferred, independent rods $r$ will be thrust into its hollow extremities and secured therein in any suitable manner. In each instance they are passed through the sleeves 9 on the outer cover 3 for the purpose of securing it to the ground, as previously described.

A backing 16 is provided for the head or foot piece, and, as herein shown is composed of coarse wire mesh which is secured to the rod $12^a$, in any appropriate manner. This backing is so arranged as to provide a space between it and the front frame for the reception of moss, ferns, leaves or other objects of adornment. The upper front of the head or foot piece, for a portion of its length, is covered with a similar coarse wire mesh 17, and the lower front of the head or foot piece is similarly covered with wire mesh 18, the lower edge of which is preferably arched, or otherwise contoured, to fit over the mound cover. The space thus provided between the upper and lower wire sections 17 and 18, may be utilized for the insertion of an appropriate inscription plate 19, which may be secured to the frame $12^a$, in any suitable manner, as by the clamps 20 shown in the drawings.

My invention, while being primarily intended for use as a cover for graves, mounds, and other objects raised above the ground, may be employed to equal advantage in providing flat and other ornamental designs for holding natural flowers for decorating purposes, the space between the walls being particularly adaptable for holding highly fertilized earth, and such other substances which would tend to invigorate and promote the growth and beauty of the flowers. When used for this purpose the lower wall will, of course, be constructed of exceedingly fine wire mesh in order to hold the earth more securely, and it will be apparent that the device may be easily moved from place to place for purposes of obtaining variations, in any floral decorations, from day to day.

It is obvious, of course, that the inner and outer covers 2 and 3, may each be made up of a plurality of sections joined together in any suitable manner. In other words, one or both covers, instead of being made in one section, as shown, may be made up of several sections adapted, when in assembled position, to interlock and form a complete structure, and this construction would render my invention the more easily handled for purposes of transportation.

Having thus described my invention, what I claim and desire to secure by Letters Patent is, as follows:

1. A cover for graves, mounds and the like, comprising an inner and outer body portion of wire mesh, adapted to fit over a grave and so arranged with respect to each other as to provide an interspace or receptacle of equal transverse dimensions throughout and in which can be positively confined moss, earth, artificial or natural flowers, and means for maintaining a definite distance between the inner and outer body portions; said means including sockets on the outer body portion, and independent removable anchoring rods bearing in said sockets.

2. A cover for graves, mounds, and the like, comprising an inner and an outer body portion of wire mesh adapted to fit over a grave and so arranged relatively with each other as to provide a space between them for the reception of moss, ferns, earth, artificial or natural flowers, means for maintaining a definite distance between the inner and outer body portion, a head or foot piece comprising two walls spaced apart to provide space between them for holding moss, ferns, earth, leaves, etc., and having an opening for receiving and retaining a slab, stone or inscription plate, and means for interlocking said head or foot piece with the cover, and for securing the same to the ground.

In witness whereof I have signed my name to this specification in the presence of two subscribed witnesses.

CARL WEBER-ILLIG.

Witnesses:
 J. A. RENNIE,
 JAMES JOHNSON.